(12) United States Patent
Itagaki et al.

(10) Patent No.: US 7,350,021 B2
(45) Date of Patent: Mar. 25, 2008

(54) METHOD OF CONTROLLING WRITE AND READ OF DATA FOR TAPE RECORDING APPARATUS

(75) Inventors: Hiroshi Itagaki, Yokohama (JP); Takashi Katagiri, Yokohama (JP); Hironobu Nagura, Kawasaki (JP); Hirokazu Nakayama, Fujisawa (JP); Yutaka Oishi, Kawasaki (JP); Toshiyuki Shiratori, Komae (JP); Terue Watanabe, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/535,045

(22) Filed: Sep. 25, 2006

(65) Prior Publication Data

US 2007/0079059 A1  Apr. 5, 2007

(30) Foreign Application Priority Data

Sep. 30, 2005  (JP)  ............................. 2005-286513

(51) Int. Cl.
    *G06F 12/00* (2006.01)
(52) U.S. Cl. .................. 711/111; 711/162; 360/55; 360/71
(58) Field of Classification Search ...................... None
    See application file for complete search history.

(56) References Cited

U.S. PATENT DOCUMENTS 5,446,597 A     8/1995  Matsumi et al.
6,097,875 A     8/2000  Matsui
6,330,640 B1 * 12/2001  Williams et al. ............. 711/112
6,792,504 B2 *  9/2004  Hoskins et al. ............. 711/112
6,795,264 B2 *  9/2004  Wilson ......................... 360/69
6,856,479 B2 *  2/2005  Jaquette et al. ............... 360/48
6,865,043 B2 *  3/2005  Ataku et al. .................. 360/48
6,970,311 B2 * 11/2005  Jaquette ....................... 360/46
7,006,760 B1    2/2006  Takagi et al.
7,019,927 B2    3/2006  Saito et al.
7,119,974 B2 * 10/2006  Jaquette ....................... 360/46
7,162,600 B2 *  1/2007  Kano et al. .................. 711/162

FOREIGN PATENT DOCUMENTS

JP          361073297       4/1986

* cited by examiner

*Primary Examiner*—Jasmine Song
(74) *Attorney, Agent, or Firm*—Jeffrey P. Aiello (57) ABSTRACT

A write/read control method for recording at least one datum on a magnetic tape within a predetermined distance is provided. The method includes sequentially accumulating a plurality of blocks of data of variable length in a buffer divided into fixed length segments and writing the contents of each segment to the tape. If the segment contains at least one block of data, the data is written to the tape as a dataset and if the segment does not contain any data, then a null dataset is written to the tape within the predetermined distance. The predetermined distance may vary depending upon the format of a tape drive embodying the method. In response to a request to read a block of data, reading at least one dataset that includes the requested block of data from the tape to segments in the buffer, and reading the requested block of data for invalidating data transfer of a null dataset in the segment. By invalidating the transfer of a null dataset, blocks of data separated by the null dataset can be reconstructed.

11 Claims, 6 Drawing Sheets

METHOD OF CONTROLLING WRITE AND READ OF DATA FOR TAPE RECORDING APPARATUS

BACKGROUND OF THE INVENTION

1. Field of the Invention

The present invention relates to devices and systems for reading and writing data to and from a magnetic tape, and more particularly, to a method for writing at least one datum to a magnetic tape within a predetermined distance of the tape.

2. Background Information

Figure 1:
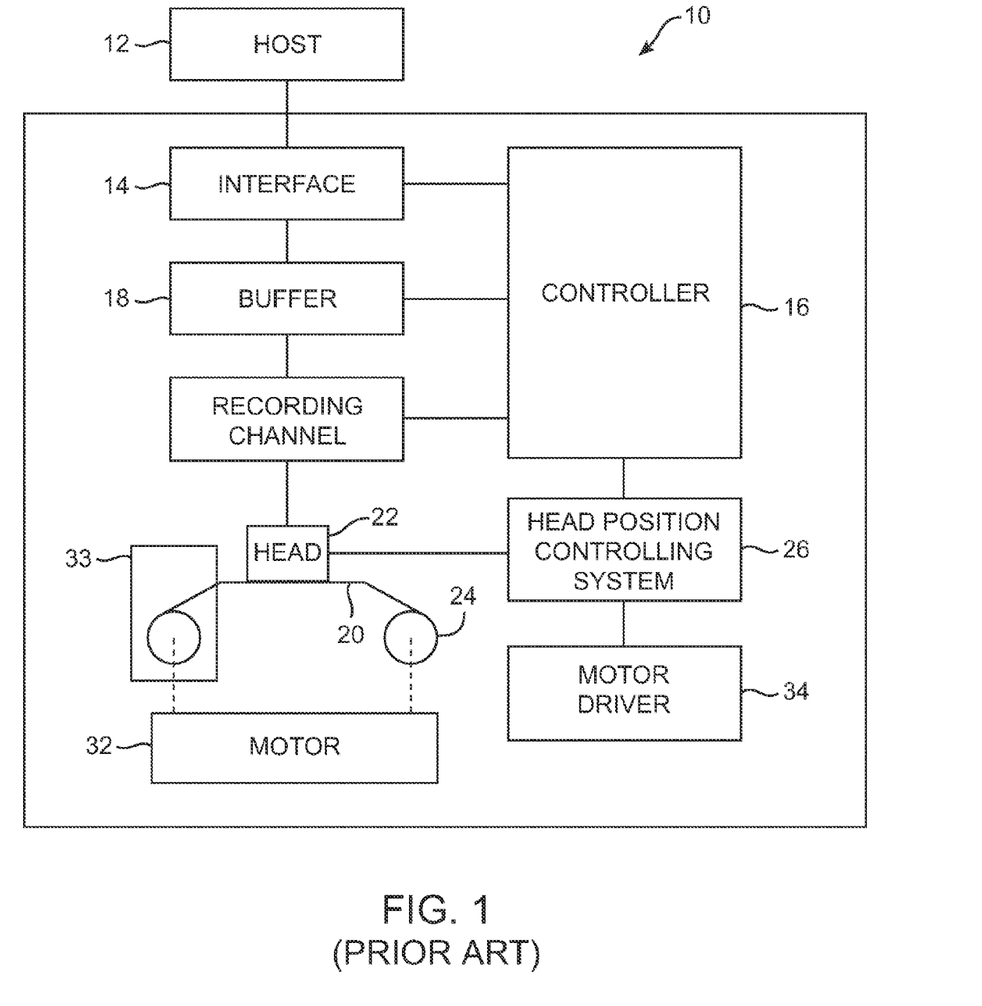
FIG. 1 is a block diagram of a prior art tape drive that may embody an embodiment of the method of the present invention.

FIG. 1 shows a conventional tape drive 10 that communicates with a host 12. The tape drive 10 includes an interface 14 for communicating with the host 12, a controller 16 for controlling many functions of the drive 10, and a buffer 18 for storing data. The host transmits commands to the tape drive via the interface for reading and writing data. Commands transmitted by the host may be writing of data to the buffer or writing of data from the buffer to a magnetic tape 20.

The host communicates with the interface via known interface standards. For example, a communication standard employed between the host and interface may be Small Computer System Interface (SCSI). When the SCSI standard is employed, the writing of data to the buffer corresponds to a Write command and the writing of data from the buffer to the tape corresponds to a Write Filemark (Write FM) or Synchronous Request (Sync) command.

The buffer may comprise a known memory device or devices, such as a Dynamic Random Access Memory device, for storing data to be written to the tape. The buffer may be configured in a plurality of segments. The buffer may function as a ring buffer, wherein data is stored into each segment sequentially. Once data is stored in a last segment of the buffer, data received thereafter is stored in a first segment.

The tape drive may also include a head 22 for reading and writing data and reels 24 for winding the tape. A head position control system 26 is coupled to the controller and to the head for controlling the position of the head on the tape for reading and writing data.

In use, units of data, or data blocks that vary in length, are transferred from the host to a segment of the buffer. The data blocks in a segment comprise a dataset. The dataset may or may not completely consume a segment of the buffer. Once a segment is at least partially filled with a dataset, the dataset is written to the tape. If the dataset does not completely consume the segment, null or dummy data may be stored with the dataset to completely consume the segment. The writing of a dataset to the tape is referred to in the art as a "Buffer-Flush".

The tape may not be stopped between write data commands received from the host. If there is a significant time period between write data commands, while the tape is running, there may be a substantial gap on the tape between adjacent datasets. The length of this gap may be in the order of meters and may be up to four meters or longer. Thus, to increase the recording capacity of the tape, the gap between adjacent datasets needs to be reduced.

To prevent datasets from being written to the tape beyond four meters of a preceding dataset, dummy or null datasets are written to the tape. A disadvantage of writing null datasets to the tape is that datasets containing data are not contiguous. Due to the fact that the datasets containing data are not contiguous, the original data blocks comprising the datasets cannot be reconstructed when a read request comes from the host, because the data are divided into null datasets.

A well known method for reducing the gap between adjacent datasets is a "backhitch". Performing a backhitch requires that the tape be stopped, reversed to beyond the end of the previous synchronization, stopped again, and accelerated up to speed in the original direction by the time that the end of the previous synchronization is reached. As is understood by those of skill in the art, the backhitch process consumes a considerable amount of time, and the throughput of the tape drive may be reduced dramatically.

A technique for overcoming the disadvantage of backhitch operations is a Recursive Accumulating backhitchless Flush (RABF) operation. Generally, in an RABF operation, a controller of the tape drive first writes data in a buffer. The tape drive receives a synchronization request and the tape drive writes the data from the buffer to a temporary recording area on the tape, with the tape continuously traveling. Simultaneously, the controller recursively accumulates data in the buffer and writes back the data to a normal recording area when either the buffer or the temporary recording area becomes full. Therefore, an RABF synchronization does not need a backhitch for subsequent synchronizations and the time required for synchronization can be reduced.

An exemplary RABF is disclosed in U.S. Pat. No. 6,856,479, to Jaquette et al., and assigned to International Business Machines Corporation, Armonk, N.Y. Disclosed therein, is a controller that detects a pattern of synchronizing events for received data records to be written to tape. The controller writes each transaction data records to the magnetic tape, accumulates the synchronized transactions in a buffer, and subsequently recursively writes the accumulated transactions of data records from the buffer to the tape in a sequence. A single backhitch may be employed to place the recursively written accumulated data records following the preceding data.

Another exemplary RABF is disclosed in U.S. Pat. No. 6,865,043, to Akaku et al., assigned to International Business Machines Corporation, Armonk, N.Y. Disclosed therein, special fields for error recovery are provided in data set information tables of data sets written with synchronized transactions. If a transaction only partially fills a data set, that data set is rewritten in a succeeding data set, appending the next transaction. A moving access point in the table identifies the appended transaction, allowing the rewritten transaction to be skipped during read recovery. The table provides recovery trails by providing a thread to the data sets together, the status of the data set, and pointers, such as identifying the wrap of the immediately succeeding data set.

However, Liner Tape-Open (LTO) format tape drive specifications require that a dataset needs to be written to the tape within four meters of another dataset. LTO tape drives frequently perform a backhitch, to prevent writing of a dataset to the tape, beyond four meters of a preceding dataset. However, as discussed above, the backhitch process consumes a considerable amount of time and reduces throughput of the tape drive. Thus, many LTO Tape drives preferably use the RABF operation. However, writing performance can be deteriorated when a Sync request is received during the backhitch of an RABF operation.

SUMMARY OF THE INVENTION

The invention provides a write/read control method for recording at least one datum on a magnetic tape within a predetermined distance. The invented method prevents backhitch operations by writing a second dataset, which may comprise a null dataset, to the tape within a predetermined distance of a first dataset. The invented method may therefore increase the throughput of a tape drive utilizing the method.

The method includes first sequentially accumulating a plurality of blocks of data whose lengths are variable in a buffer divided into fixed length segments. The contents of each segment of the buffer are then written to the tape.

If the contents of a segment contain at least one block of data, the data is written to the tape as a dataset. If the contents of the segment do not contain any data, then a dummy, or null, dataset is written to the tape within the predetermined distance. The predetermined distance may vary depending upon the format of the tape drive embodying the method. The predetermined distance may be about four meters, for example, when the method is utilized in a Liner Tape-Open (LTO) format tape drive.

In response to a host computer's request to read a block of data, at least one dataset that includes the requested block of data is read from the tape to segments in the buffer. The requested block of data is also read for invalidating data transfer of a null dataset in the segment. By invalidating the transfer of a null dataset, blocks of data separated by the null dataset can be reconstructed.

The method may be in the form of a computer program. When the method is running as a computer program on a computer, the program may first sequentially accumulate a plurality of blocks of data of variable lengths in a buffer divided into fixed length segments. The contents of each segment of the buffer are then written to a magnetic tape of a tape drive controlled by the computer.

If the contents of a segment contain at least one block of data, the data is written to the tape as a dataset. If the contents of the segment do not contain any data, then a dummy, or null, dataset is written to the tape within the predetermined distance. The predetermined distance may vary depending upon the format of the tape drive embodying the method and coupled to the computer. In response to a request to read a block of data, reading at least one dataset that includes the requested block of data from the tape to segments in the buffer, and reading the requested block of data for invalidating data transfer of a null dataset in the segment.

DESCRIPTION OF THE PREFERRED EMBODIMENTS

Figure 2:
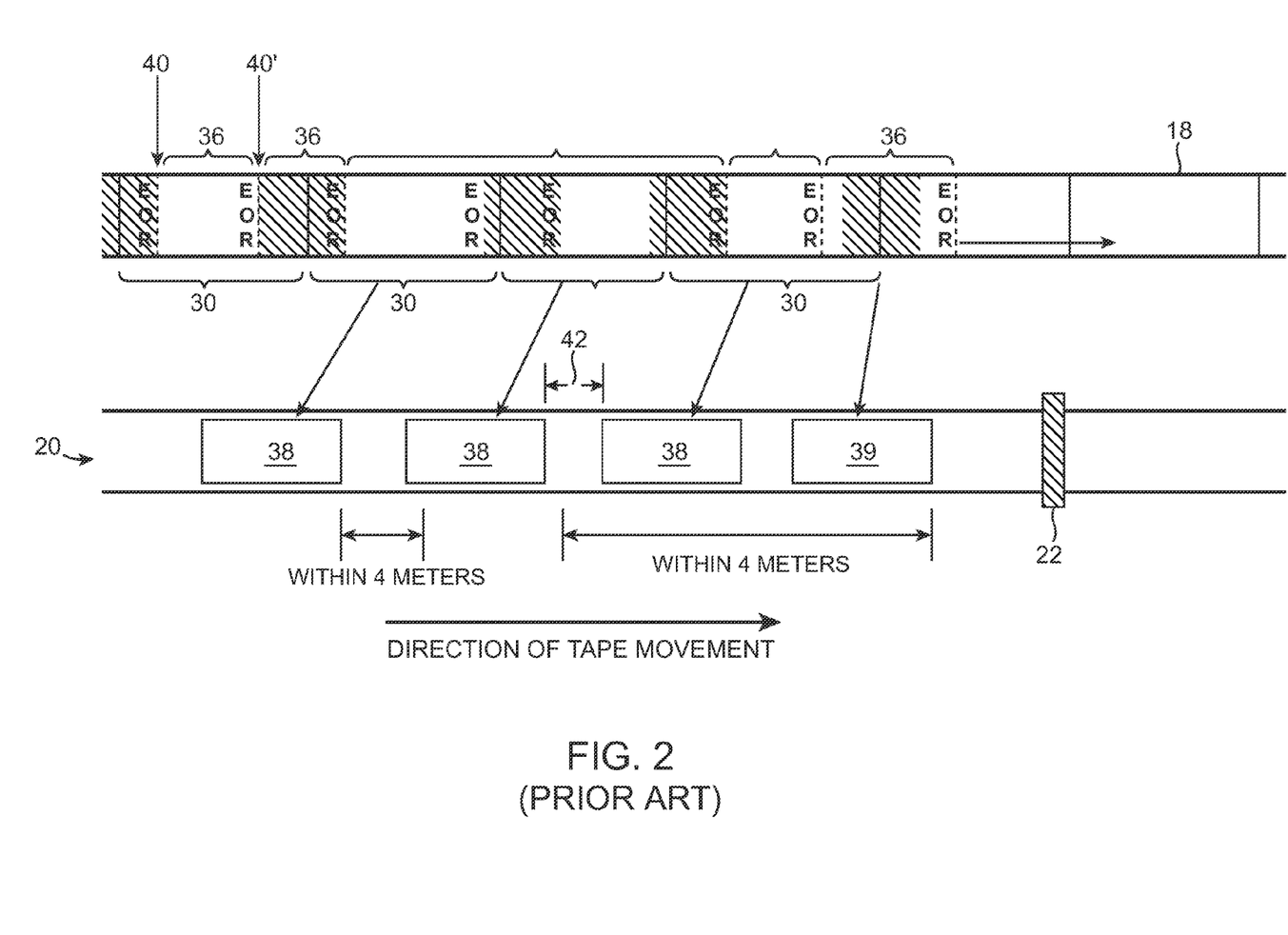
FIG. 2 a block diagram showing a prior art method for writing datasets to a magnetic tape.

Referring to FIG. 1 and FIG. 2 of the drawings, an exemplary embodiment of the method of the present invention may be embodied in the conventional tape drive 10. As previously discussed, the tape drive 10 includes the controller 16 for controlling many functions of the drive 10, and buffer 18 for storing data. The host 12 transmits commands to the drive 10 via the interface 14 for reading and writing data.

The buffer 18 may comprise a known memory device or devices, such as a Dynamic Random Access Memory device (DRAM), for storing data to be written to the tape 20 and for storing data read from the tape 20. The buffer 18 may be configured in a plurality of fixed length segments 30. The data capacity of the segments 30 may differ depending upon the size of the memory device, or devices, comprising the buffer 18 and the type of tape drive 10, among various other factors for example. An exemplary buffer 18 may comprise a plurality of segments 30, with each segment 30 configured to retain approximately 500K bytes of data. Alternatively each segment 30 may have a data capacity of about 2 MB. The buffer 18 may function as a ring buffer, wherein data is stored into each segment 30 sequentially, to be discussed thoroughly hereinafter.

The tape drive 10 may also include a motor 32 for rotating the reels 24 and motor driver 34 that drives the motor 32 responsive to instructions received from the controller 16. A cartridge 33 may be provided for containing a reel 24, and thus the tape 20 wound on the reel 24.

Blocks of data 36, hereinafter data blocks or blocks, to be written to the tape 20 are first transferred from the host 12 to the buffer 18. Data blocks 36 accumulate in segments 30 of the buffer 18, as they are sequentially transferred from the host 12 to the buffer 18. Once a segment 30 is filled with data blocks 36, the blocks filing the segment 30 create a dataset 38 to be written to the tape 20. Data block 36 may be configured with an End of Record (EOR) marker 40 at each end of the block 36. For example, each block 36 has a first end marker 40 and a second end marker 40'. The controller 16 uses the end markers 40, 40' for reference, when manipulating the data blocks 36.

The data blocks 36 may vary size significantly. In Liner Tape-Open (LTO) format tape drives, for example, data blocks range up to about 16 Mbytes. In other tape drives, the blocks 36 may reach a maximum size of about 2 Mbytes. Thus, a single data block 36 may be split between segments 30 and divided into two or more datasets 28. Once the data storage capacity of a segment 30 is reached, the dataset 38 is written to the tape 20.

However, the data blocks 36 stored in a segment 30 may not completely consume the data storage capacity of the segment 30. If the storage capacity of the segment 30 is not reached, a dataset 38 is not written to the tape 20. If the tape 20 continues to move in relation to the head 22, a gap 42 may be created between adjacent datasets 38. The gap 42 between datasets 38 may be substantial. The length of this gap 42 may be in the order of meters and may be up to four meters or longer.

Liner Tape-Open (LTO) format tape drives require that a dataset be written to the tape every four meters. This requirement is known in the art as the LTO 4 meter rule or 4 meter rule. Thus, a gap 42 between datasets 38 greater than four meters violates the 4 meter rule. To prevent the drive 10 from violating the 4 meter rule, a null dataset 39 is written to the tape 20. Writing the null dataset 39 the tape 20 within 4 meters of a preceding dataset 38 prevents violation of the 4 meter rule and avoids backhitches.

Figure 3:
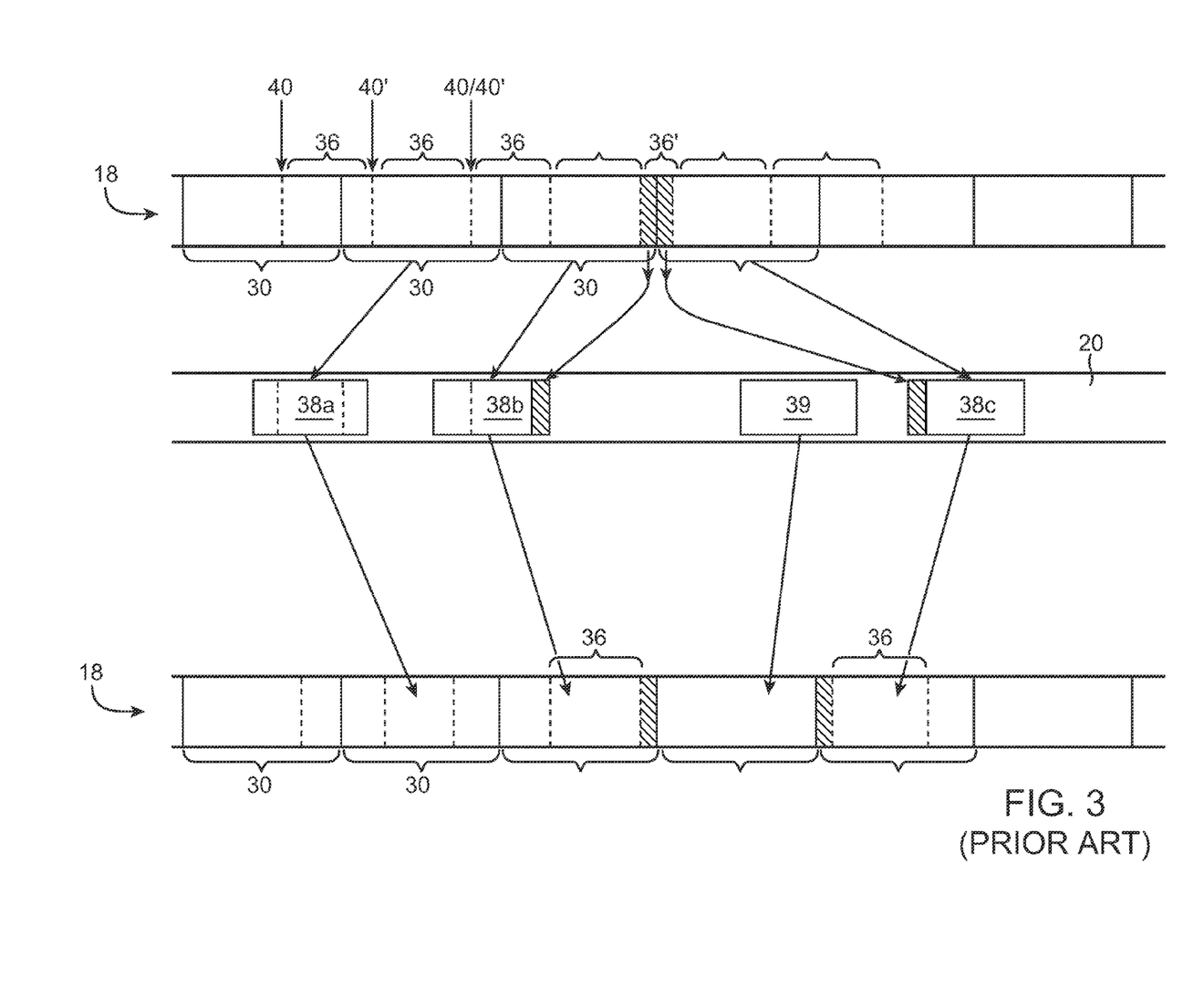
FIG. 3 is a block diagram showing a prior art method for reading datasets, including null datasets, stored on a magnetic tape to a buffer.

Referring to FIG. 3, there is shown a prior art method for reading datasets 38 from the tape 20 to the buffer 18, with a null dataset 39 interposed between adjacent datasets 38*b*, 38*c*. Datasets 38 are sequentially read from the tape 20 to the buffer 18 by means of a known sequential read method of the drive 10. Since the null dataset 39 separates the adjacent datasets 38*b*, 38*c*, an original data block 36' that the datasets 38*b*, 38*c* comprised, cannot be reconstructed when the datasets 38*b*, 38*c* are read from the tape 20 into the buffer 18. Additionally, a fatal error can occur when datasets 38 that have been compressed are expanded, since the null dataset 39 prevents the controller 16 from accurately expanding datasets 38*b*, 38*c* separated by the null dataset 39.

Figure 4:
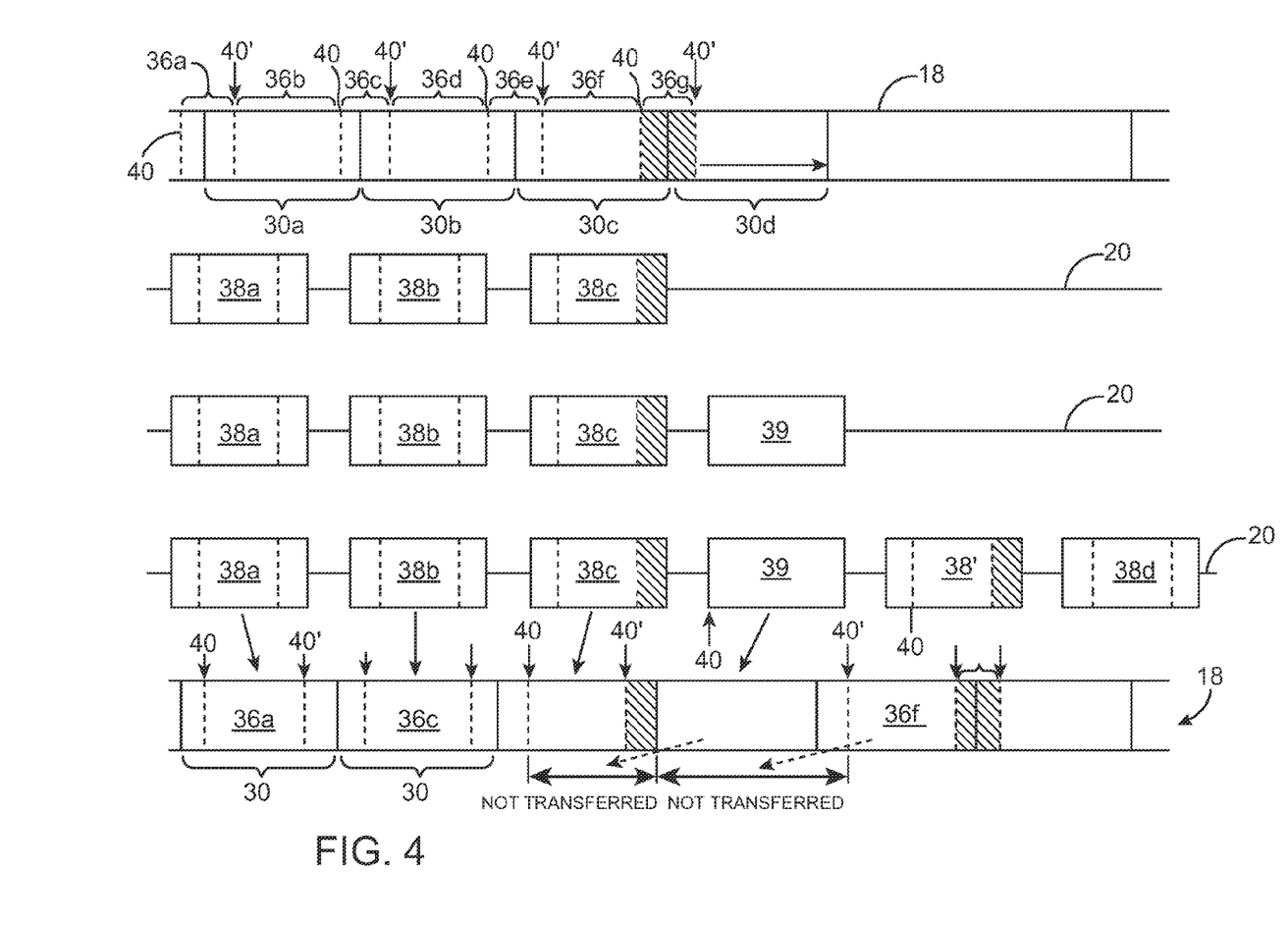
FIG. 4 is a block diagram showing an exemplary embodiment of a write/read control method according to the present invention.

FIG. 4 shows an exemplary embodiment of the invented method. It is to be understood that all forms of data including, data blocks and datasets, as well as segments 30 of the buffer 18 are kept to a minimum in the drawings and discussion for the sake of clarity only. Data blocks 36*a*, 36*b*, 36*c*, 36*d*, 36*e*, 36*f*, 36*g* are sequentially stored in segments 30*a*, 30*b*, 30*c*, 30*d* of the buffer 18. Each block 36 is configured with a first end marker 40 and a second end marker 40'. The controller 16 reads the first and second end markers 40, 40' as references for controlling data transfer. Some data blocks 36 may span more than one segment 30 and may span several segments 30. Blocks 36 are stored in each segment 30, until the storage capacity of the segment 30 is reached. Data blocks 36 are then stored in the next subsequent segment 30, as is common to ring-type buffers. The data blocks 36 filling a segment 30 comprise a dataset 38.

However, the data blocks 36 may not fully consume a segment 30 of the buffer 18, as shown in the fourth segment 30*d*. If the blocks 36 do not completely fill the segment 30, a dataset 38 is not created and a null dataset 39 is generated.

As datasets 38*a*, 38*b*, 38*c* are generated, they are sequentially written to the tape 20. When a next sequential dataset to be written to the tape 20 comprises a null dataset 39, the null dataset 39 is first written to the tape 20. Next, the dataset 38*c* immediately preceding the null dataset 39 is rewritten to the tape 20 as a duplicate dataset 38'. A subsequent dataset 38*d* may then be written to the tape 20.

Both the null dataset 39 and duplicate dataset 38' are provided with an invalidation flag (not shown). The invalidation flag is used to prevent the host 12 from reading either duplicate or unnecessary data. The invalidation flag may be included in a Data Set Information Table (DSIT) provided in the datasets 38', 39.

Datasets 38*a*, 38*b*, 38*c* are sequentially read from the tape 20 into each segment 30*a*, 30*b*, 30*c*, of the buffer 18. Duplicate data or null data is prevented from being transferred to the host 12, by the controller 16 reading an end marker of a dataset that immediately precedes a dataset with the invalidation flag. This may be either the first end marker 40 of a dataset 38*c* immediately preceding a null dataset 39 or the second end marker 40' of a null dataset 39 immediately preceding a duplicate dataset 38'. The selected end marker is used as a starting point. The transfer of data from the starting point to a selected end point is invalidated.

The end point may be a point in common with the starting point, such as the first end marker 40 of the duplicate dataset 38' or the second end 40' of the null dataset 39. The end point may also be a selected first end marker 40, second end marker 40', or end of record (EOR), which is common between the dataset immediately preceding a null dataset 39 and its duplicate segment 38'.

For example, the first end marker 40 of the dataset 38*c* immediately preceding a null dataset 39 is used as a starting point. The transfer of data from the starting point, i.e. the first end marker 40 of the dataset 38*c*, to the second end marker 40' of the null dataset 39, i.e. the end point, is invalidated. Thus, the dataset 38*c* and null dataset 39 are not transferred to a segment 30 of the buffer 18, while the duplicate dataset 38' is transferred to the buffer 18. Thus, data transferred to the buffer 18 is not duplicated.

Figure 5:
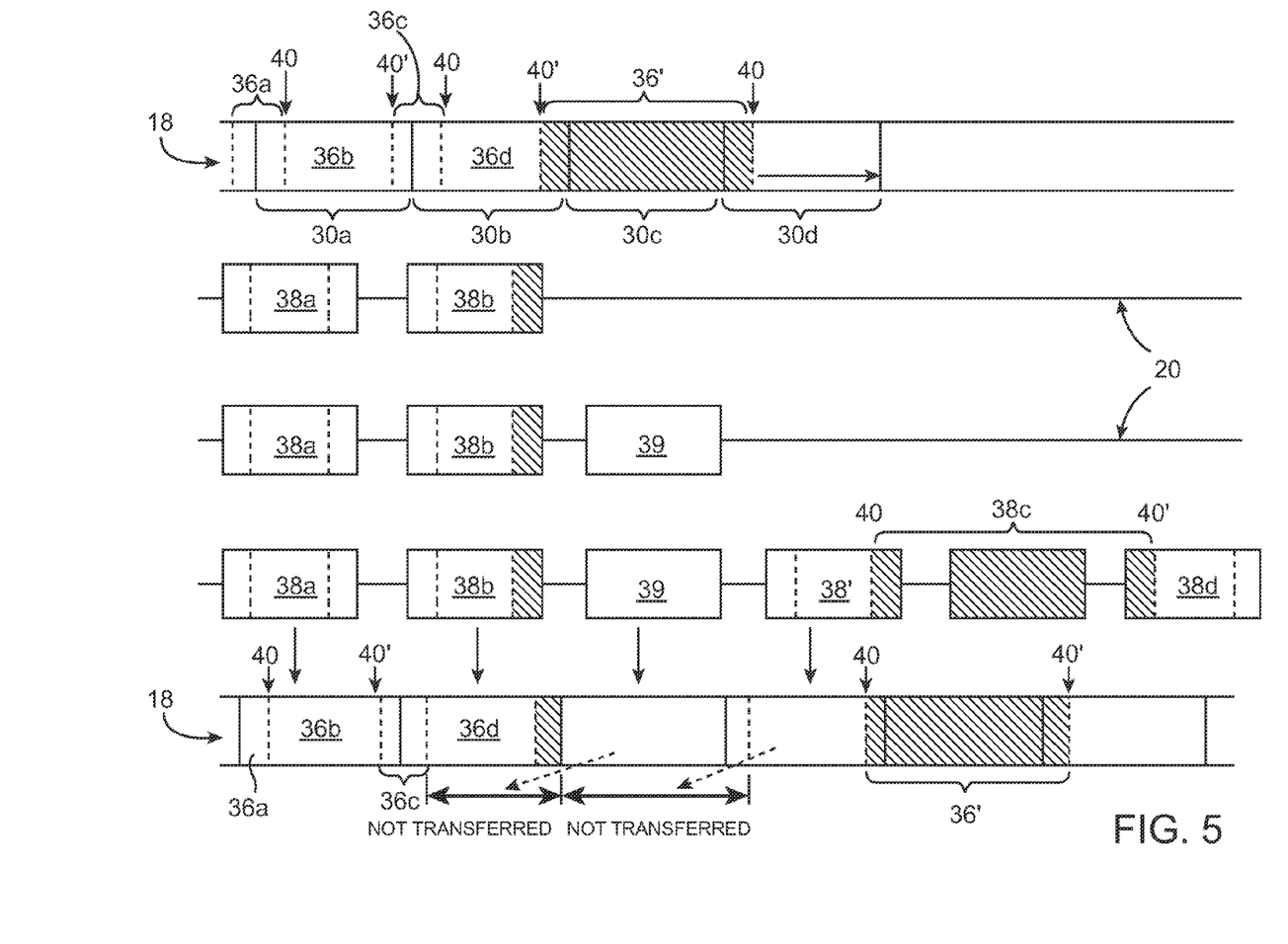
FIG. 5 is a block diagram showing an exemplary embodiment of the write/read control method according to the present invention.

Referring to FIG. 5, a data block 36 may span several segments 30. In the Figure, a data block 36' spanning three segments 30*b*, 30*c*, 30*d* is shown. The controller 16 controls the sequential transfer of data blocks 36 between the host 12 and the buffer 18 by using the first and second end markers 40, 40' as references. Thus, the controller 16 transfers data block 36*a* to a first segment 30*a*; block 36*b* to the first and segments 30*a*, 30*b*; block 36*c* to the second segment 30*b*; and data block 36' to the second through fourth segments 30*b*, 30*c*, 30*d* of the buffer 18.

The controller 16 controls writing of data to the tape 20, where a segment 30 of the buffer has no end marker 40, 40' and is completely filled with data as follows. In a first segment 30 where there is no end marker 40, 40' and the segment 30 is completely filled with data, if a second segment, immediately following the first segment 30, contains an end marker 40, 40', then the datasets 38 of both segments 30 are written to the tape 20 simultaneously, following a null dataset 39.

If the buffer 18 is in a stand-by condition, due to slow data transfer or the fourth segment 30*d* not being completely filled with data, a dataset 38 is not written to the tape 20 and the 4 meter rule may be violated. To avoid violation of the 4 meter rule, a null dataset 39 may be written between the second and third datasets 38*b*, 38*c*.

For example, the first two segments 30*a*, 30*b* are filled with data, thus generating datasets 38*a*, 38*b*. The third segment 30*c* is consumed with the data block 36', and the fourth segment 30*d* is not completely filled with data. The third segment 30*c* of the buffer 18 does not contain either a first end marker 40 or second end marker 40' of the data block 36', as the block 36' spans three segments 30*b*, 30*c*, 30*d*.

Even though the third segment 30*c* is completely filled with data, so that a third dataset 38*c* can be generated, the third dataset 38*c* is not written to the tape 20 before the null dataset 39. Instead, the null dataset 39 is first written to the tape 20. The second dataset 38*b* immediately preceding the null dataset 39 is written as a duplicate dataset 38' immediately following the null dataset 39. Simultaneously, the datasets 38*c*, 38*d* of the third and fourth segments 30*c*, 30*d* are written to the tape 20. By successively writing the data stored in the segments 30*b*, 30*c*, 30*d* the data is contiguous.

As discussed above, the null dataset 39 and duplicate dataset 38' may be provided with an invalidation flag to prevent the host 12 from reading either duplicate or unnecessary data. Alternatively, only the null dataset 39 may be provided with an invalidation flag. Use of the invalidation flag to prevent the host 12 from reading either duplicate or unnecessary data functions as discussed previously.

Additionally, the write method of the invention is not limited to a write that is performed with taking into consideration the interposition of the null dataset 39 and the duplicate dataset 38' immediately after the null dataset 39. The invented read method is not limited to the read method ensuring the contiguous data blocks 36 by means of the invalidation flags respectively of the null dataset 39 and the duplicate dataset 38' immediately after the null dataset 39, which have been written by use of the write method.

For example, the read method includes a case where the buffer 18 can be accessed for each byte unit as well. In a case where datasets 38 are sequentially transferred, as read data, to the host 12, the read which invalidates a null dataset 39 interposed in the middle of one block 36 makes it possible to secure the contiguous data block 36. The invention includes various specific write/read control methods which are not limited to the foregoing examples as long as the original block can be reconstructed by ignoring unnecessary data, which have been written, for the purpose of avoiding a backhitch occurring in order to keep the distance between data on the tape 20 at or under the predetermined distance.

Figure 6:
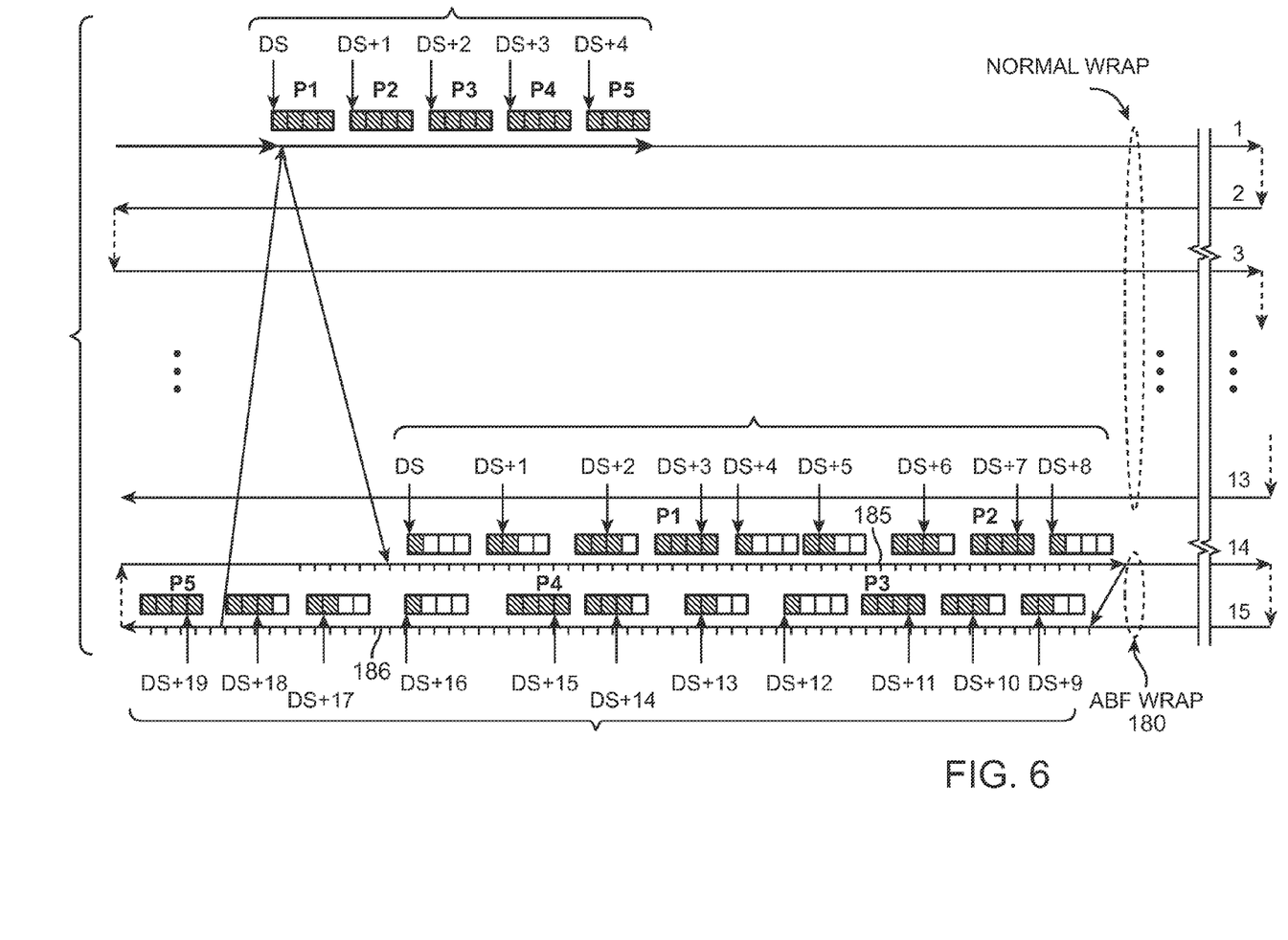
FIG. 6 is a block diagram showing an alternative embodiment of the method of the present invention.

Referring to FIG. 6, even with RABF operations, write by backhitch in violation of the 4 meter rule exists in write to an ABF wrap area of the tape 20. A write is performed using bands 145 of a plurality of tracks for a temporary storage wrap 180 (ABF wraps) and for a normal wrap 165 depending on purposes. The head 22 may includes 8 or 16 write/read channels. The wraps are groups of tracks in a plurality of tracks, and are units by which the head 22 performs data writing and reading.

Data blocks are transferred from the host 12 to the ABF wrap 180 (the tracks 14 and 15) are written to the tape 20 without backhitch. The normal wrap 165 is configured of the tracks 1 to 13 to which datasets DS are written without using memory capacity ineffectually. When the drive 10 receives a synchronous request, data in the buffer 18 are written to the ABF wrap 180 while letting the tape 20 continue running without backhitch. The datasets DS written to the ABF wrap are rewritten, to the normal wrap 165 via the buffer 18. The datasets (DS, DS+1, DS+2, . . . ) are written thereto one-by-one. These datasets DS are written by a backhitchless Flush. Datasets DS+3, DS+7, DS+11, DS+15 and DS+19 are datasets P1, P2, P3, P4 and P5 which have been filled with data blocks 36. These prepared datasets P1, P2, P3, P4 and P5 recursively perform a rewrite operation on the normal warp 165 (the tracks 1, 2, 3, . . . , 13) at certain intervals. This rewrite operation causes the datasets P1, P2, P3, P4 and P5, which have been filled with the data blocks 36, to be written to the normal wrap 165 without using memory capacity ineffectually. A tape drive 10 using the RABF method of this type also makes it possible to improve write performance, because no backhitch is needed for satisfying a series of synchronous requests, except for avoiding the violation of the 4 meter rule.

If the invented write method is applied to RABF technologies, it possible to fully improve the write performance an increase data storage capacity of the tape. Specifically, the invented write method does not cause backhitch in violation of the 4 meter rule, and accordingly has an advantageous effect in which a complete backhitchless write is realized. The application of the write/read control method of the invention to RABF operations makes it possible to eliminate the interposition of backhitch while keeping the storage capacity maximized. Resultantly, write performance is maximized.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for according at least one datum on a magnetic tape in a predetermined distance in a longitudinal direction of the tape, the method comprising the following steps:

sequentially storing a plurality of variable length data blocks in a buffer divided into fixed length segments, the data blocks transferred from a host and sequentially accumulated in the segments with ends of the data blocks compressed and used as end markers, the data blocks to be read are determined by locating the end markers of the data block in the segment, the data blocks stored in a segment of the buffer comprising a dataset;

determining if the end markers of a data block are present in a segment and if the end markers of a data block are present in the segment, then writing the dataset to the tape, and writing a null dataset to the tape within the predetermined distance when a subsequent segment does not contain at least one data block while the tape is moving the predetermined distance; upon a null dataset being written to the tape, duplicating a dataset preceding the null dataset and writing the duplicate dataset to the tape so that datasets preceding the null dataset are continguous with datasets following the null datasets; and in response to a request of a data block to be read, reading datasets including the null dataset, the duplicated dataset, and the duplicate dataset from the tape to segments in the buffer, and invalidating the null dataset and selectively invalidating one of the duplicated dataset and the duplicate dataset in the reading datasets so that data blocks read are contiguous.

2. The method of claim 1 further comprising:

selectively invalidating one of the dataset and the null dataset to secure the contiguousness of the data block.

3. The method of claim 2 wherein a dataset of a first segment of the more than one segment and a dataset of a subsequent segment of the more than one segment are written to the tape.

4. The method of claim 3 wherein the dataset of each segment that the data block spans is written to the tape simultaneously.

5. The method of claim 3 wherein in a case where the subsequent segment that includes the ends is written to the tape, is similar to the dataset immediately preceding the null dataset written to the tape is written as a duplicate dataset to the tape while interposed immediately after the null dataset at the same time as datasets up to the subsequent segment are written thereto.

6. The method of claim 5 wherein the null dataset and the duplicate dataset include invalidation flags, and in the reading step, in a case where the datasets respectively include the invalidation flags are read to segments in the buffer, transfer of data in segments immediately preceding segments corresponding to the datasets including the invalidation flags is invalidated.

7. A method for recording at least one datum on a magnetic tape within a predetermined distance in a longitudinal direction of the tape, the method comprising the following steps:

sequentially accumulating a plurality of variable length data blocks into fixed length segments of a buffer, the data blocks transferred from a host and sequentially accumulated in the segments, ends of the data blocks being compressed and used as references, the blocks of data stored in each segment until a storage capacity of the segment is reached to generate a dataset;

sequentially writing datasets to the tape while the tape is moving, and writing a null dataset to the tape within the predetermined distance when the storage capacity of a subsequent segment is not reached;

upon a null dataset being written to the tape, duplicating a dataset preceding the null dataset and writing the duplicate dataset to the tape so that datasets preceding the null dataset are contiguous with datasets following the null dataset; and in response to a request of a data block to be read, reading datasets including the requested data block from the tape to a segment in the buffer, and reading the requested data block for invalidating data transfer of the null dataset to a segment in the buffer.

8. The method of claim 7, further comprising:

reading the null dataset, the duplicated dataset, and the duplicate dataset; and invalidating the null dataset and selectively invalidating one of the duplicated dataset and the duplicate dataset in the so that data blocks read are contiguous.

9. The method of claim 8 further comprising:

if a data block spans more than one segment, then writing the datasets of the more than one segment to the tape, such that data from a first end marker to a second end marker of the data block is written to the tape.

10. The method of claim 9 wherein a dataset of a first segment of the more than one segment and a dataset of a subsequent segment of the more than one segment are written to the tape.

11. The method of claim 10 wherein the dataset of each segment that the data block spans is written to the tape simultaneously.

* * * * *